United States Patent
Heller

(12) United States Patent (10) Patent No.: US 8,262,826 B1
Heller (45) Date of Patent: Sep. 11, 2012

(54) INSULATION WRAP

(75) Inventor: Patrick S. Heller, Middlebury, IN (US)

(73) Assignee: Thermo Dyne, Inc., Elkhart, IN (US)

( * ) Notice: Subject to any disclaimer, the term of this patent is extended or adjusted under 35 U.S.C. 154(b) by 0 days.

(21) Appl. No.: 12/871,477

(22) Filed: Aug. 30, 2010

(51) Int. Cl.
*E04C 3/30* (2006.01)

(52) U.S. Cl. ........ 156/196; 156/216; 156/217; 156/218; 156/203; 156/204; 156/466; 156/465; 156/464; 156/40; 156/44; 53/455

(58) Field of Classification Search ............... 156/196.1, 156/216, 217, 218, 203, 204, 466, 465, 464, 156/40, 44; 53/455
See application file for complete search history.

(56) References Cited

U.S. PATENT DOCUMENTS

| | | | |
|---|---|---|---|
| 1,774,813 A * | 9/1930 | Raynes | 162/124 |
| 3,435,582 A * | 4/1969 | Ptasienski et al. | 52/608 |
| 6,412,247 B1 * | 7/2002 | Menchetti et al. | 52/847 |
| 2005/0255308 A1 * | 11/2005 | Gregg et al. | 428/312.4 |

OTHER PUBLICATIONS

Definition of stitch by the Free Online Dictionary, Thesaurus and Encyclopedia; http://www.thefreedictionary.com/stitch; p. 1-2 of 6, Oct. 25, 2011.*

* cited by examiner

*Primary Examiner* — Jeff Aftergut
*Assistant Examiner* — Jaeyun Lee
(74) *Attorney, Agent, or Firm* — Botkin & Hall, LLP.

(57) ABSTRACT

A method for producing insulation tape. A strip of fabric is provided and a layer of insulation powder material is deposited onto the fabric. The fabric is folded over the insulation powder to form insulation tape that may be wrapped around pipes. The method of folding the fabric includes first bending the fabric into a trough shape that has a bottom portion and lateral upstanding flaps that terminate in lateral edges. The insulation powder may be deposited onto the bottom portion of the trough. The insulation powder is packed onto the bottom portion. Tape with adhesive on both sides is placed on one of the flaps so that when the flaps are folded in overlapping contact over the insulation powder the powder is enclosed and the flaps remain secured to each other. Stitching may be added to further secure the adhered flaps to each other and to the bottom portion.

2 Claims, 6 Drawing Sheets

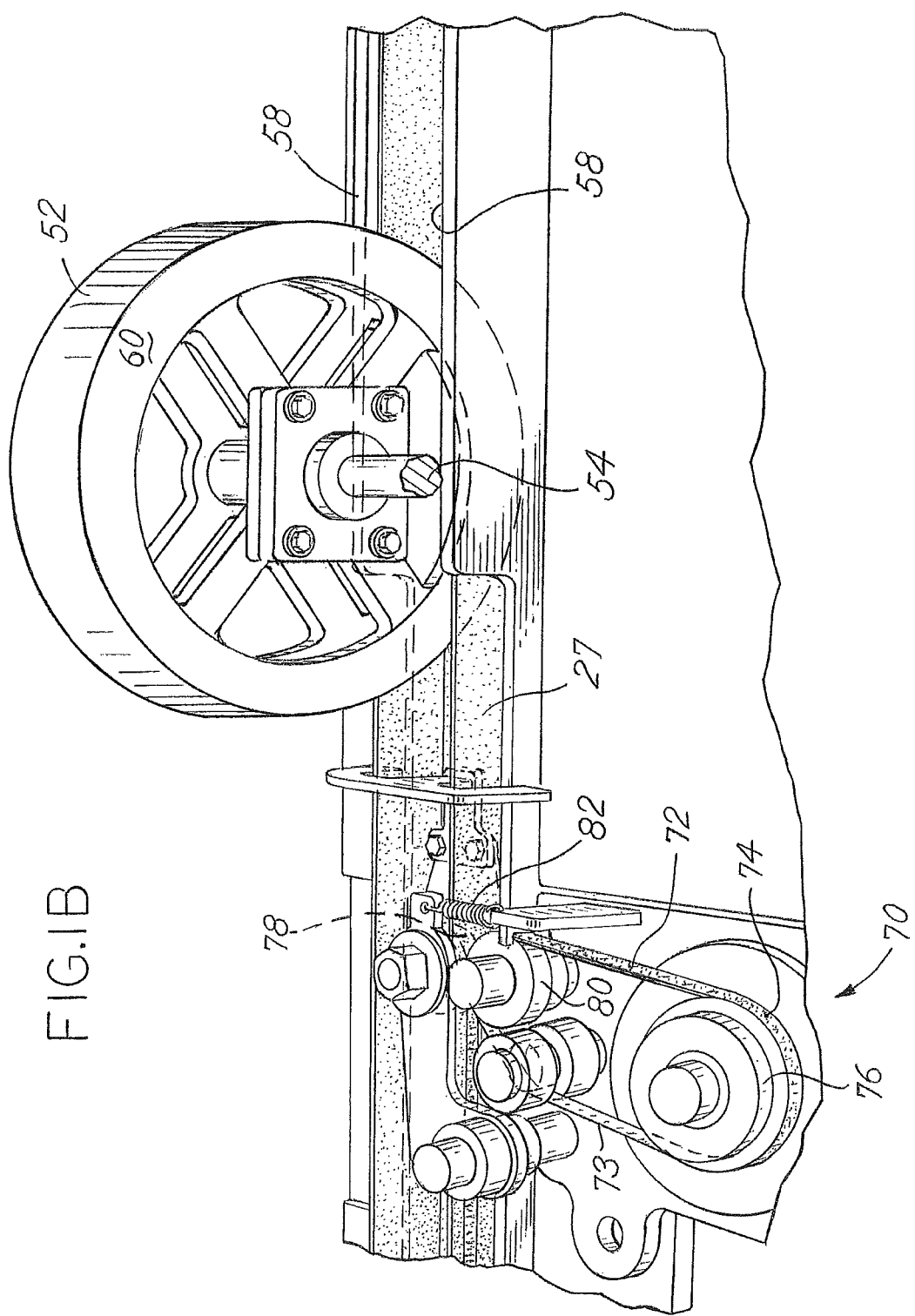

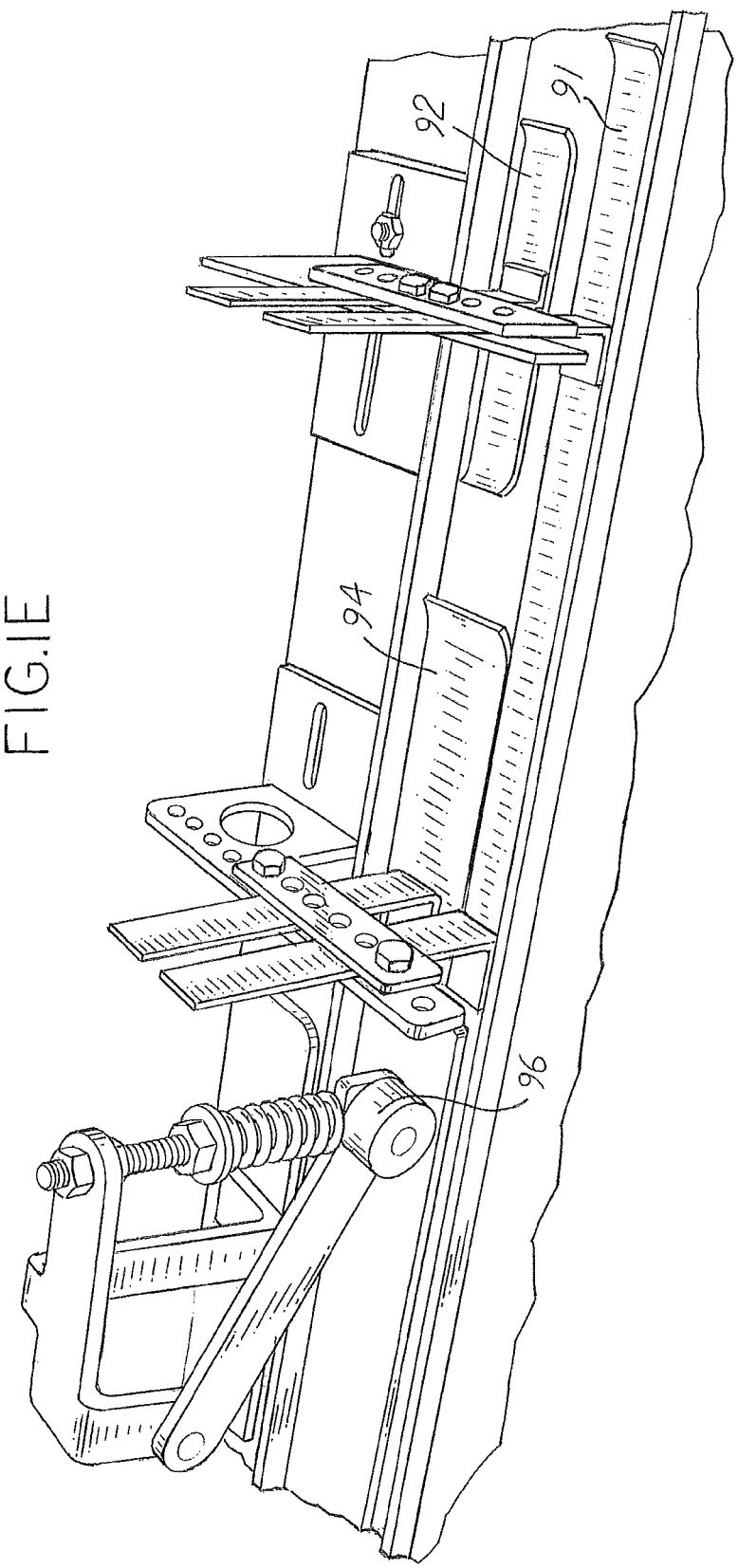

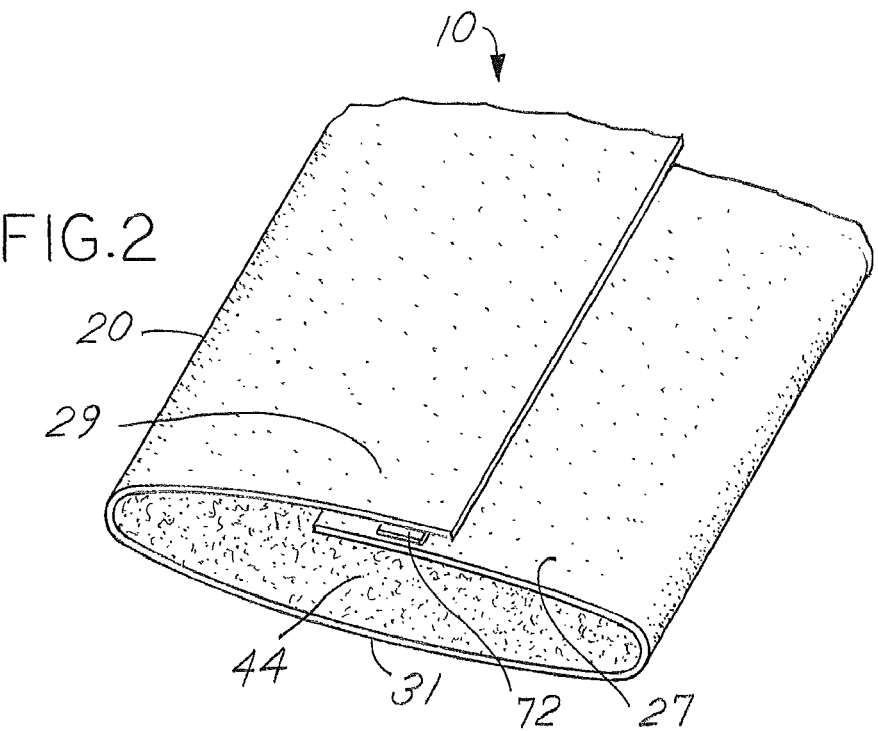
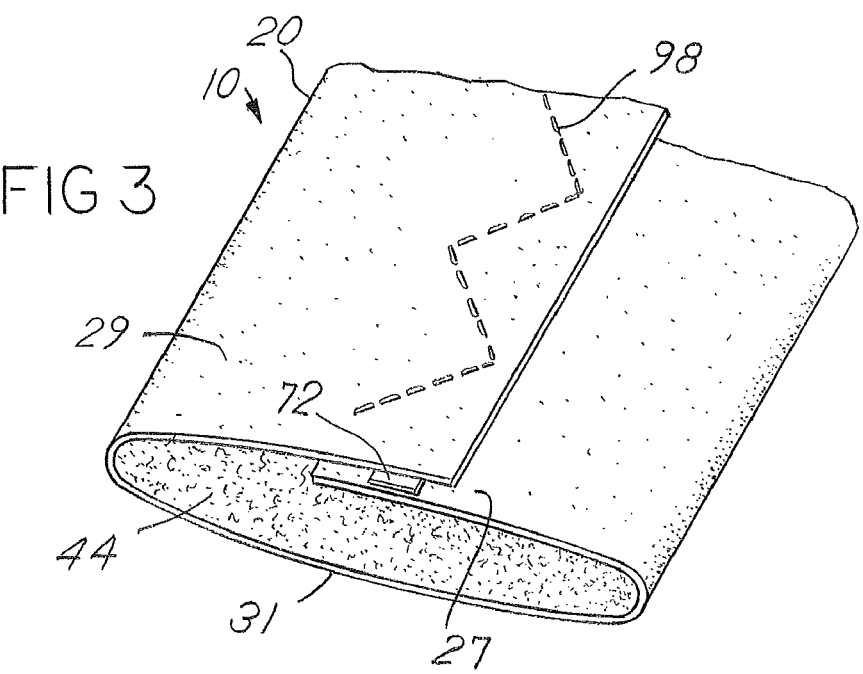

INSULATION WRAP

BACKGROUND OF THE INVENTION

High temperature insulation is often in a powdery flaky form that is not well suited to sustain mechanical abrasion. Having the high temperature insulation protected from external elements is often necessary to prevent damage to the insulation and keep it in place. Covering the high temperature insulation with an outer covering can be cumbersome and there is a need for a method to do this.

SUMMARY OF THE INVENTION

The present invention relates to the production of insulation tape. A strip of fabric is provided and a layer of insulation powder material is deposited onto the fabric. The fabric is folded over the insulation powder to form insulation tape that may be wrapped around pipes.

A method of folding the fabric may include first bending the fabric into a trough shape that has a bottom portion and lateral upstanding flaps that terminate in lateral edges. The insulation powder may be deposited onto the bottom portion of the trough. The insulation powder can be packed onto the bottom portion. Tape with adhesive on both sides may be placed on one of the flaps so that when the flaps are folded in overlapping contact over the insulation powder to enclose it, the flaps remain secured to each other. Additionally, stitching may be done to secure the flaps to each other and to the bottom portion.

BRIEF DESCRIPTION OF THE DRAWINGS

FIG. 1B is a perspective view of the compacting wheel and tape applicator;

FIG. 1E is a perspective view of the presser feet and spring loaded roller;

FIG. 2 is a perspective sectional view of the finished insulation tape; and

FIG. 3 is a perspective sectional view of the finished insulation tape with stitching added.

DETAILED DESCRIPTION OF INVENTION

Figure 1:
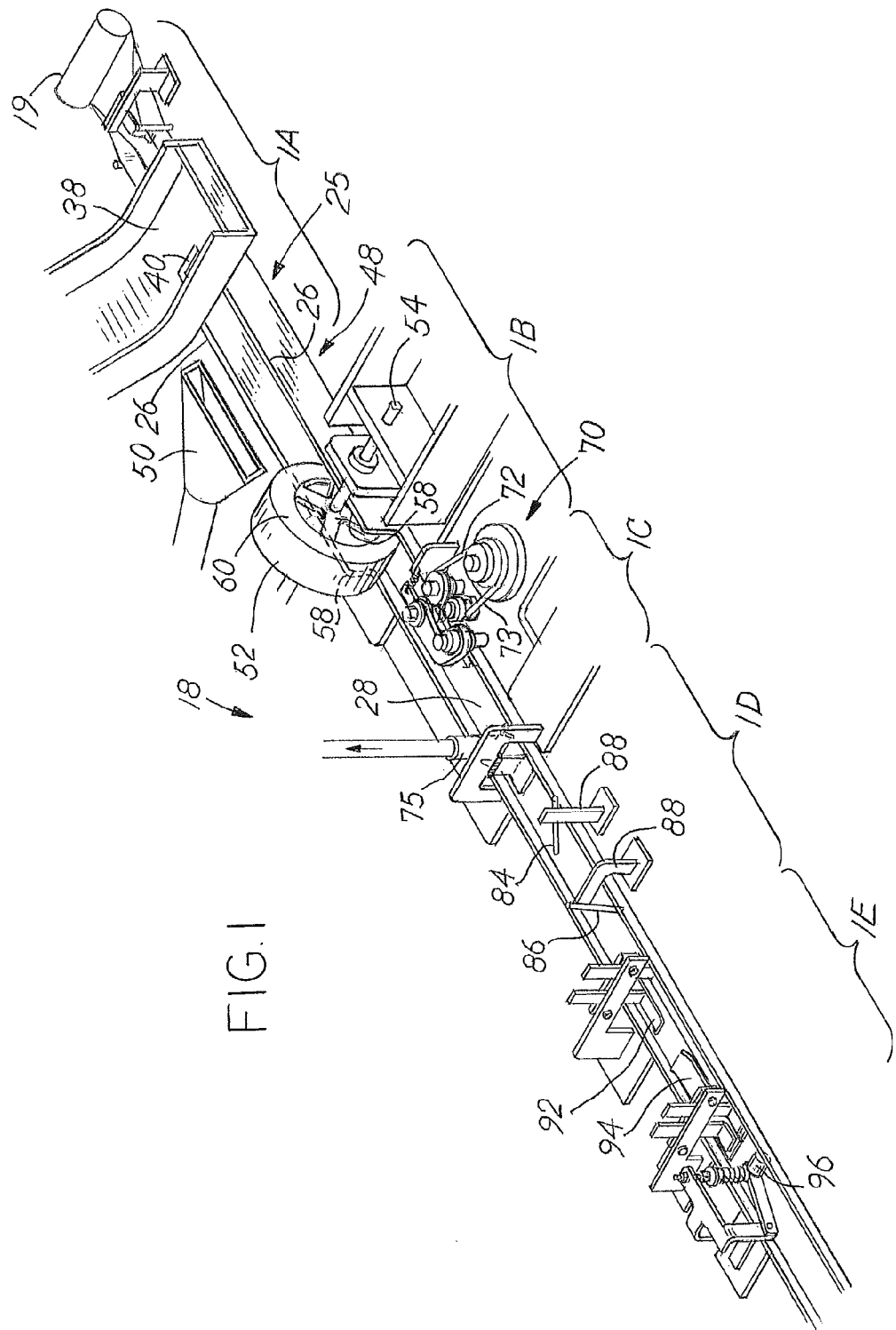
FIG. 1 is a perspective view of the machine line on which the insulation tape is manufactured.
Figure 1A:
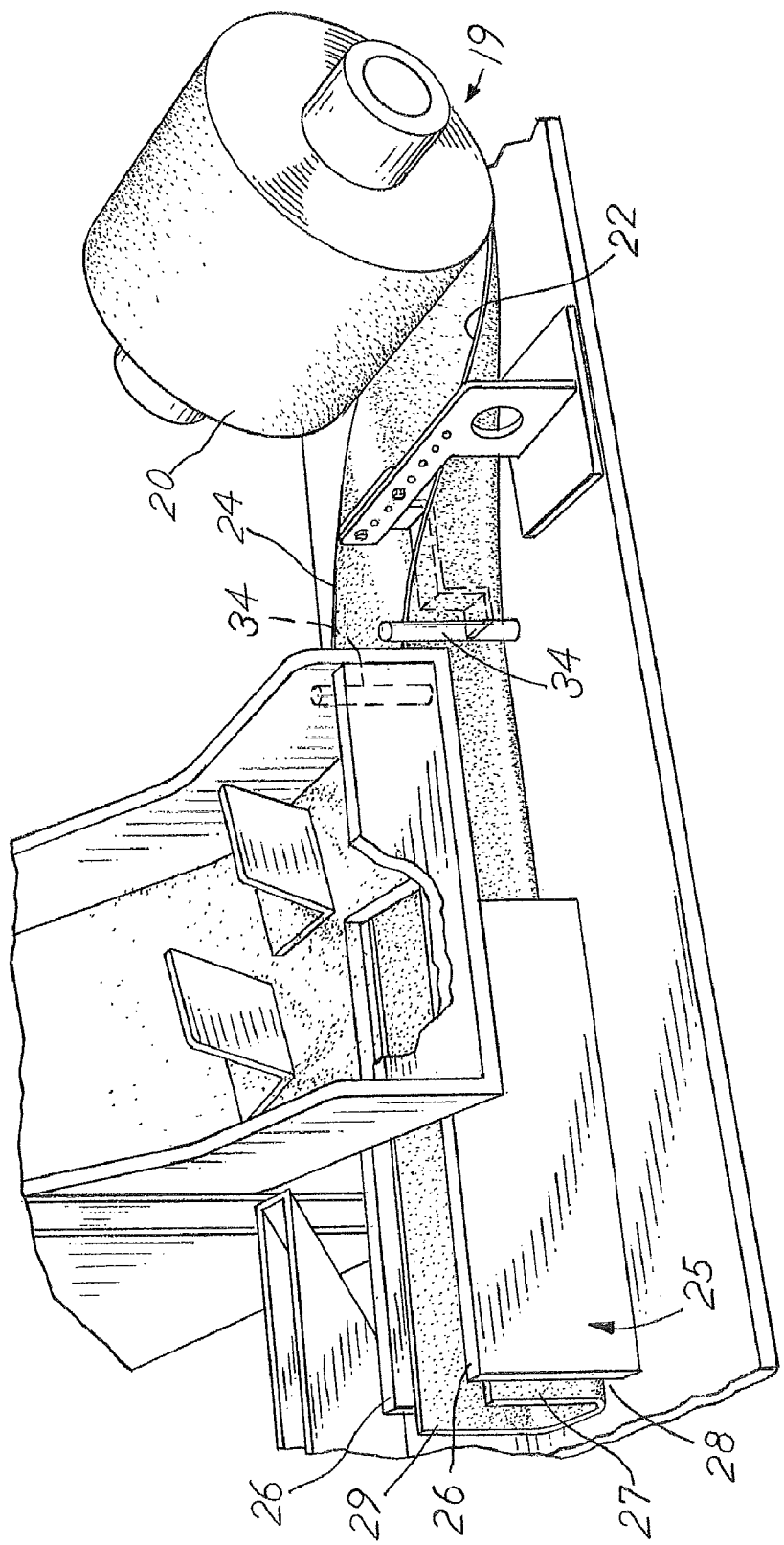
FIG. 1A is a perspective view of the roll from which the fabric enters the machine line and the hopper which stores the insulation powder.

The present invention relates to the manufacture of insulation tape 10 that is useful for wrapping pipes, but may also be used to wrap other objects. FIG. 2 shows the finished insulation tape 10. FIG. 1 shows an overall perspective layout of the machine line 18 used to make the insulation tape 10. The process of making the insulation tape 10 begins with a roll 19 of insulation fabric 20 that is typically woven fiberglass cloth. The fabric 20 has lateral edges 22, 24 and is unwound as a flat strip from the roll 19. The fabric 20 is bent into a trough shape to be fed into a channel 25 having sidewalls 26 and a smooth bottom 28. The bottom 28 of the channel 25 is a continuous piece of steel extending the length of the machine line 18 and is a support for underneath fabric 20 through all operations down the machine line 18. As the fabric 20 enters the machine line 18, it is held down to the bottom 28 with a presser foot 30 and bent upward into the trough shape with a pair of starter pegs 34 on opposite sides of the fabric 20. The fabric 20 in its trough shape has a first flap 27, a second flap 29 and a bottom portion 31 between the flaps 27, 29.

The fabric 20 slides freely through the channel 25 and a hopper 38 is located above the channel 25. The hopper 38 has a hole 40 in its bottom directly over the channel 25. Insulation powder 44 is stored within the hopper 40. The insulation powder 44 is pushed through the hole 40 and falls onto the bottom portion 31 of the fabric 20 within the channel 25. The insulation powder 44 may be a mixture of glass fibers and metal oxides, or other powdered insulative materials commonly known in the art. After the insulation powder 44 is deposited onto the bottom portion 31 it is leveled by an operator of the line 18 using a scraper to leave a consistent depth of powder 44. The leveling of the insulation powder 44 is done in a rear section 48 of the channel 25. An air duct 50 having a constant vacuum is next to the rear section of the channel 25 to prevent any of the insulation powder 44 from becoming airborne.

As the fabric moves down the machine line 18 it will arrive at a compacting wheel 52 shown in FIG. 1B. The compacting wheel 52 is supported on an axle 54 and rotates at a predetermined distance above the bottom 28 piece of steel. The compacting surface of the compacting wheel 55 is smooth. As the compacting wheel 52 rotates, the insulation powder 44 is tamped into a flexible but cohesive insulation medium. As FIG. 1B shows, when the fabric 20 moves past the compacting wheel 52 it is captured between sidewalls 58 and the sides 60 of the wheel 52. As such the compacting wheel 52 compacts the insulation powder 44 across the entire bottom portion 31 of the fabric 20.

Figure 1C:
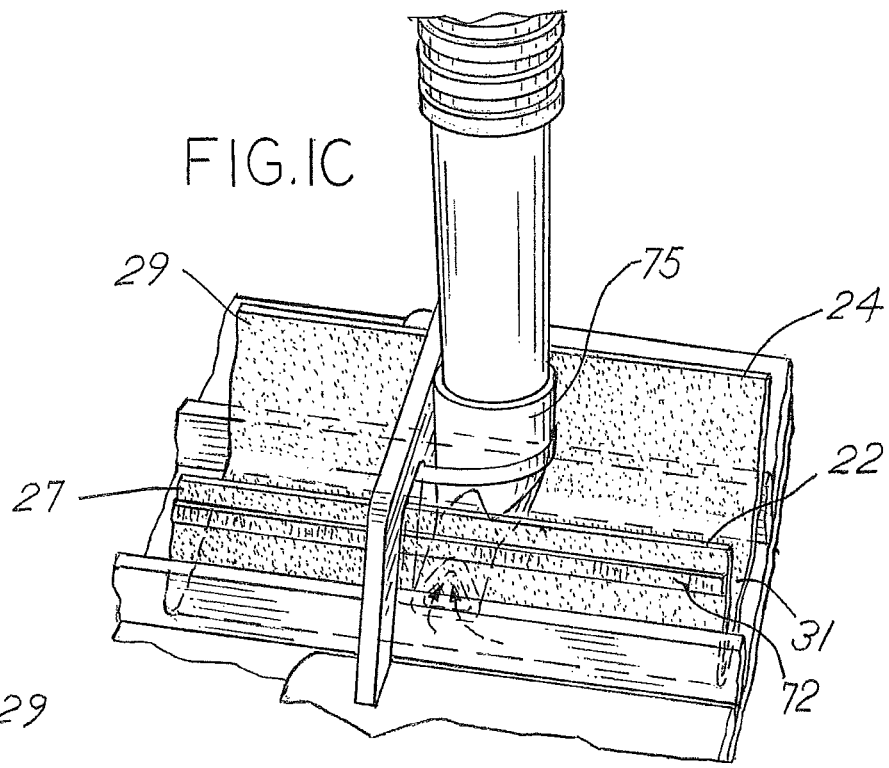
FIG. 1C is a perspective view of the vacuum nozzle after the tape applicator.
Figure 1D:
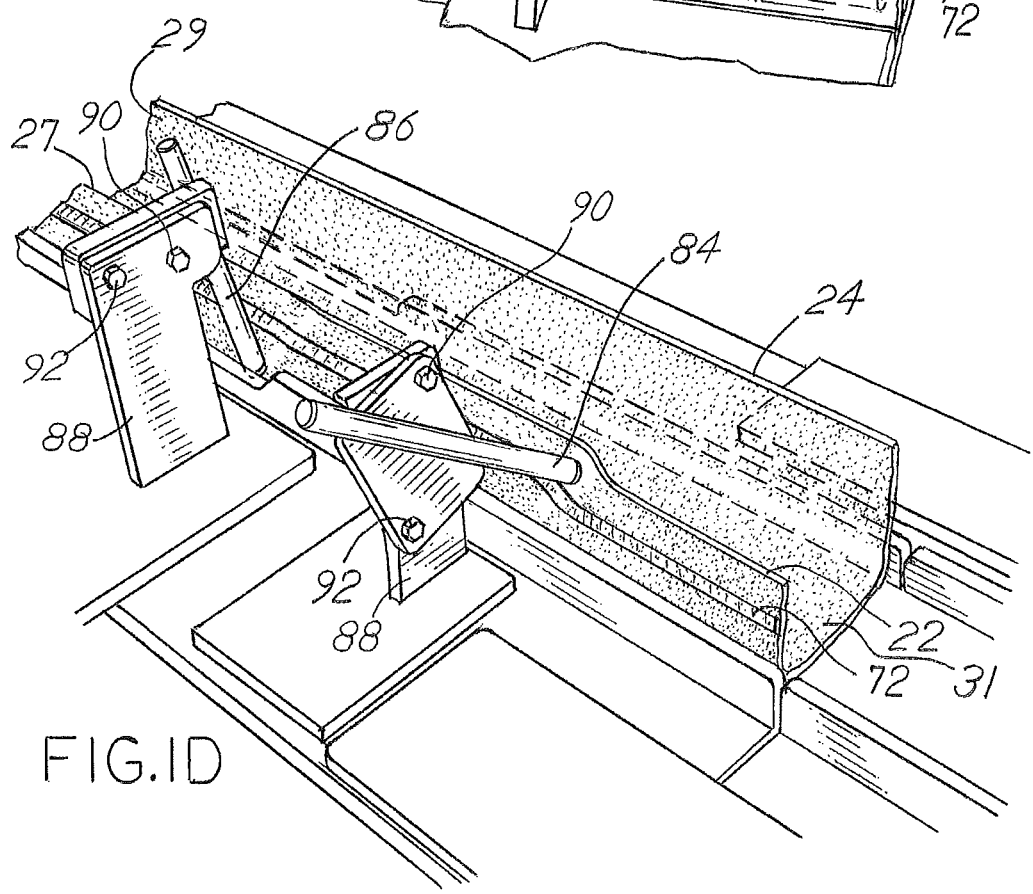
FIG. 1D is a perspective view of the bending pegs.

After the compacting wheel 52 is a tape applicator 70 that puts adhesive tape 72, having adhesive on both sides, onto one the first flap 27. The adhesive tape 72 has a film 73 that separates the tape 72 from itself so that its adhesive sides do not contact each other. The tape 72 is stored on a main roller 74 and as the film 73 is peeled from the tape, the film 73 is wound onto a scrap winder roll 76. An inner roller 78 and an outer roller 80 are pinched against the flap 27 with a spring 82. As the flap 27 moves between the rollers 78, 80 the tape 72 is pressed against it. As the tape 72 winds around the outer roller 80 it is prevented from sticking to the outer roller 80 by the film 73. The scrap winder roll 76 receives the film 73 and stores it as the tape 72 is applied. Upon leaving the tape applicator 70 the tape will remain on the outside of the flap 27 as shown in FIGS. 1C and 1D. A vacuum nozzle 75, as shown in FIG. 1C, will remove any remaining loose insulation powder dust 44 from the fabric 20.

The first flap 27 is to be folded down against the insulation powder 44 that overlies the bottom portion 31. To accomplish this task a first bending peg 84 and a second bending peg 86 are used to push the first flap 27 down. The bending pegs 84, 86 are shown in FIG. 1D. The first and second bending pegs 84, 86 are placed on brackets 88 and may be pivoted about a pin 90, then secured into the optimum position by a bolt 92. The first bending peg 84 is positioned to push the flap 27 into a position where it begins to lay down near the bottom portion 31 of the fabric. The second bending peg 86 pushes the flap 27 down near its final position.

After the first flap 27 is put into position, the second flap 29 falls down toward the bottom portion 31 under its own weight. With the first flap 27 in its lowered position, the tape 72 will be facing up and contact the second flap 29 when it is placed over the first flap 27. A first foot 91 presses down on the first flap 27 to hold it tightly against the insulation powder on the bottom portion 31. The first foot 91 contacts the fabric 20 first, as shown in FIG. 1E. A second foot 92 guides the second flap 29 down against the first flap 27. A third foot 94 behind the second foot 92 presses the second flap 29 against the tape. A spring loaded roller 96 located directly over the tape 72 presses the second flap 29 and tape 72 against the first flap 27 so the tape 72 tightly bonds the fabric 20 together.

After the insulation tape 10 leaves the roller 96 it is a completed product ready to be used and may be cut to any length desired. FIG. 2 shows a sectional view of the finished product of this invention. As shown in FIG. 2, the tape 72 holds the fabric 20 around the compacted insulation powder 44. This results in a highly insulative yet flexible insulation tape 10 that may be easily wrapped around pipes. If a more secure bond is desired to fasten the flaps 27, 29 together, stitching may be added to the finished insulation tape 10, shown in FIG. 3. FIG. 3 shows the stitching 98 added to the tape 10. The stitching 98 is in a zig zag pattern sewn through both flaps 27, 29 and through the bottom portion 31 of the tape 10. The finished insulation tape 10 shown, in FIGS. 2 and 3, may be rolled onto a storage roll for storage.

The invention is not limited to the details given above, but may be modified within the scope of the following claims.

What is claimed is:

1. A method for making insulation wrap comprising the steps:

provide a strip of fabric having lateral edges;

bending said strip into a trough shape having a bottom portion and lateral upstanding flaps terminating at said lateral edges depositing a layer of powdered insulative material onto said bottom portion of said trough;

packing said powdered insulative material into said trough;

folding one of said flaps at least partially overlying said powdered insulative material;

folding said other flap over said one flap to enclose said insulative material; and stitching said folded flaps to each other and stitching said flaps to said bottom portion.

2. A method for making insulation wrap comprising the steps:

providing a strip of fabric having lateral edges;

bending said strip into a trough shape having a bottom portion that is between upstanding flaps that terminate at said lateral edges;

depositing a layer of powdered insulative onto said bottom portion of said strip;

compacting said powdered insulative material;

folding one of said flaps so at least a portion of said insulative material is located between said one flap and said bottom portion applying double sided adhesive tape to said one flap;

folding said other flap over said one flap so both flaps contact said adhesive tape and enclose said insulative material and;

stitching through said flaps and said bottom portion to secure said flaps from movement.

\* \* \* \* \*